(12) United States Patent
Maro

(10) Patent No.: US 8,678,347 B2
(45) Date of Patent: Mar. 25, 2014

(54) MANIFOLD ACTUATOR ASSEMBLY

(75) Inventor: Randall A Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 444 days.

(21) Appl. No.: 12/886,023

(22) Filed: Sep. 20, 2010

(65) Prior Publication Data
US 2012/0067258 A1 Mar. 22, 2012

(51) Int. Cl.
*A01C 7/08* (2006.01)
*A01C 7/16* (2006.01)
*A01C 7/20* (2006.01)

(52) U.S. Cl.
USPC .................................................. 251/129.15

(58) Field of Classification Search
USPC ........................... 111/11, 178, 200, 177, 170; 251/129.15; 70/278.7
See application file for complete search history.

(56) References Cited

U.S. PATENT DOCUMENTS

| | | | |
|---|---|---|---|
| 3,910,497 A * | 10/1975 | Manor | 239/127 |
| 5,878,679 A | 3/1999 | Gregor et al. | |
| 2009/0079624 A1 | 3/2009 | Dean et al. | |
| 2010/0307394 A1* | 12/2010 | Snipes et al. | 111/11 |

FOREIGN PATENT DOCUMENTS

| | | |
|---|---|---|
| DE | 19541826 | 5/1997 |
| EP | 2260689 | 12/2010 |
| EP | 2314142 | 4/2011 |

OTHER PUBLICATIONS

European Search Report, received Jan. 20, 2012, (5 pages).

* cited by examiner

*Primary Examiner* — Christopher J Novosad
(74) *Attorney, Agent, or Firm* — Klintworth & Rozenblat IP LLC

(57) ABSTRACT

A manifold actuator assembly is provided with a manifold comprising a block, and a hydraulic actuator connected to a solenoid valve within the block. The solenoid valve controls hydraulic, linear movement of a rod of the hydraulic actuator. The manifold actuator assembly may be used in a metering system to open and close movable gates disposed downstream from a meter roller before product enters a distribution system. The manifold actuator assembly may also be used as a locking apparatus to lock and unlock members in a wide variety of applications.

11 Claims, 10 Drawing Sheets

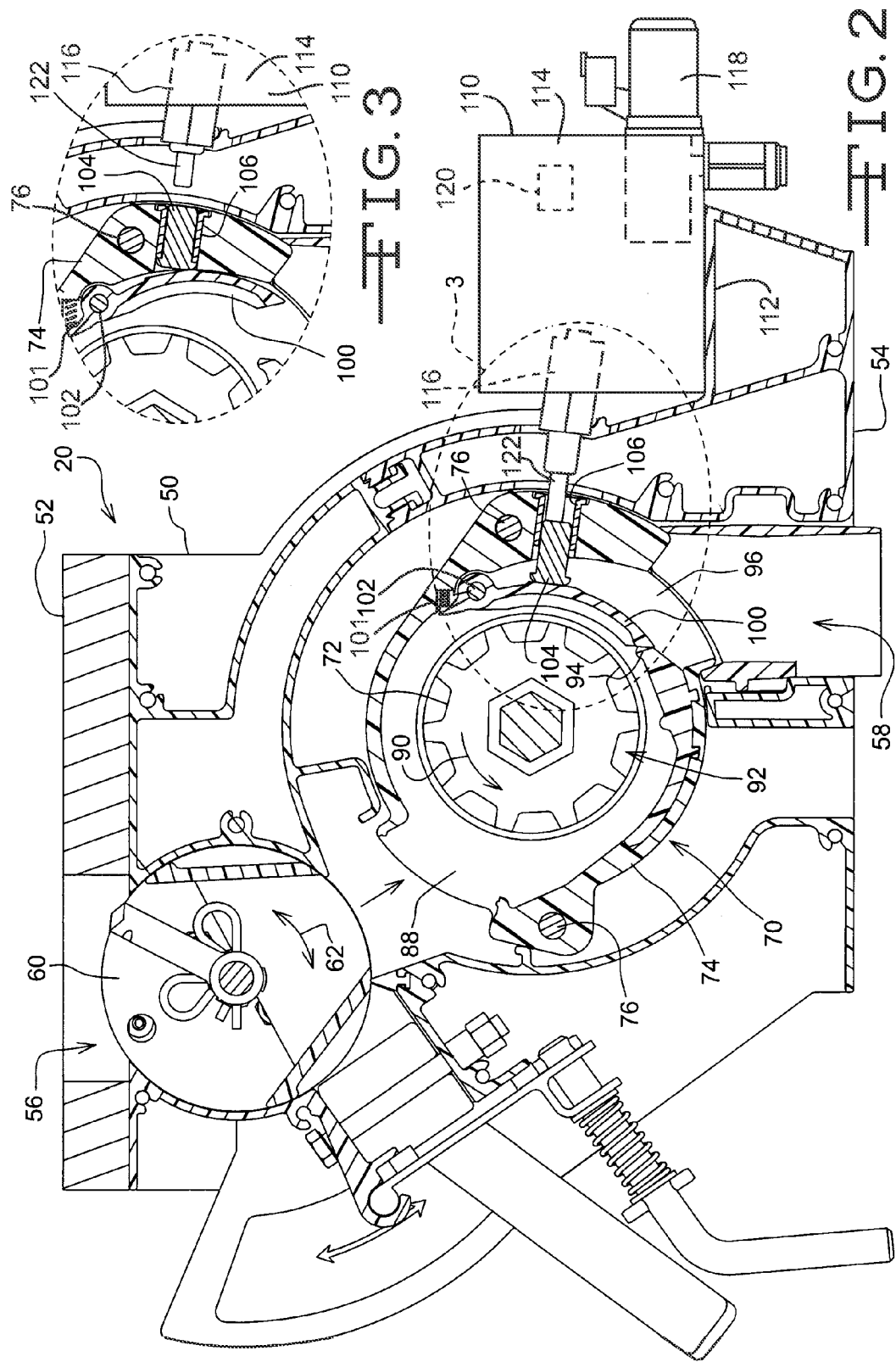

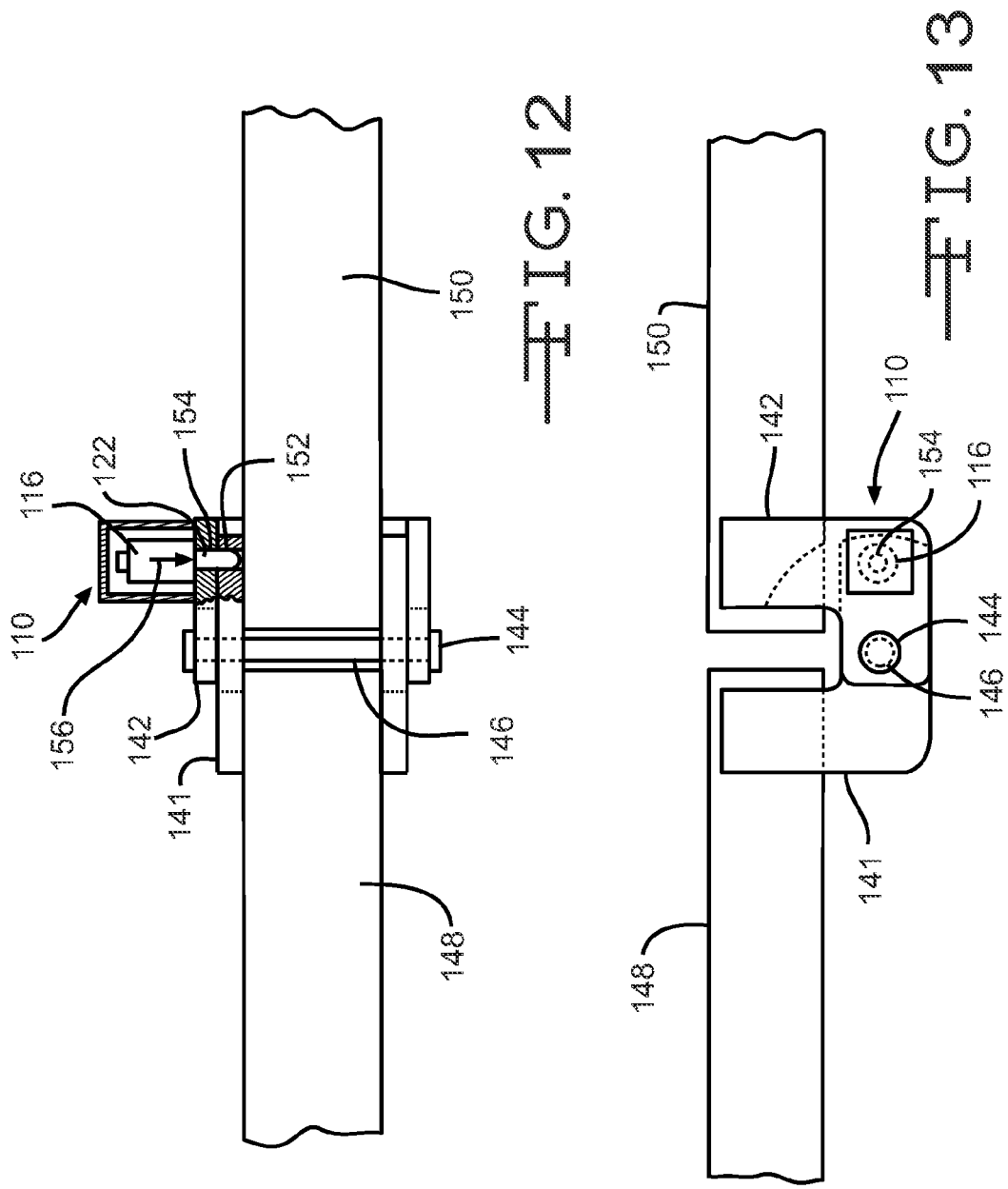

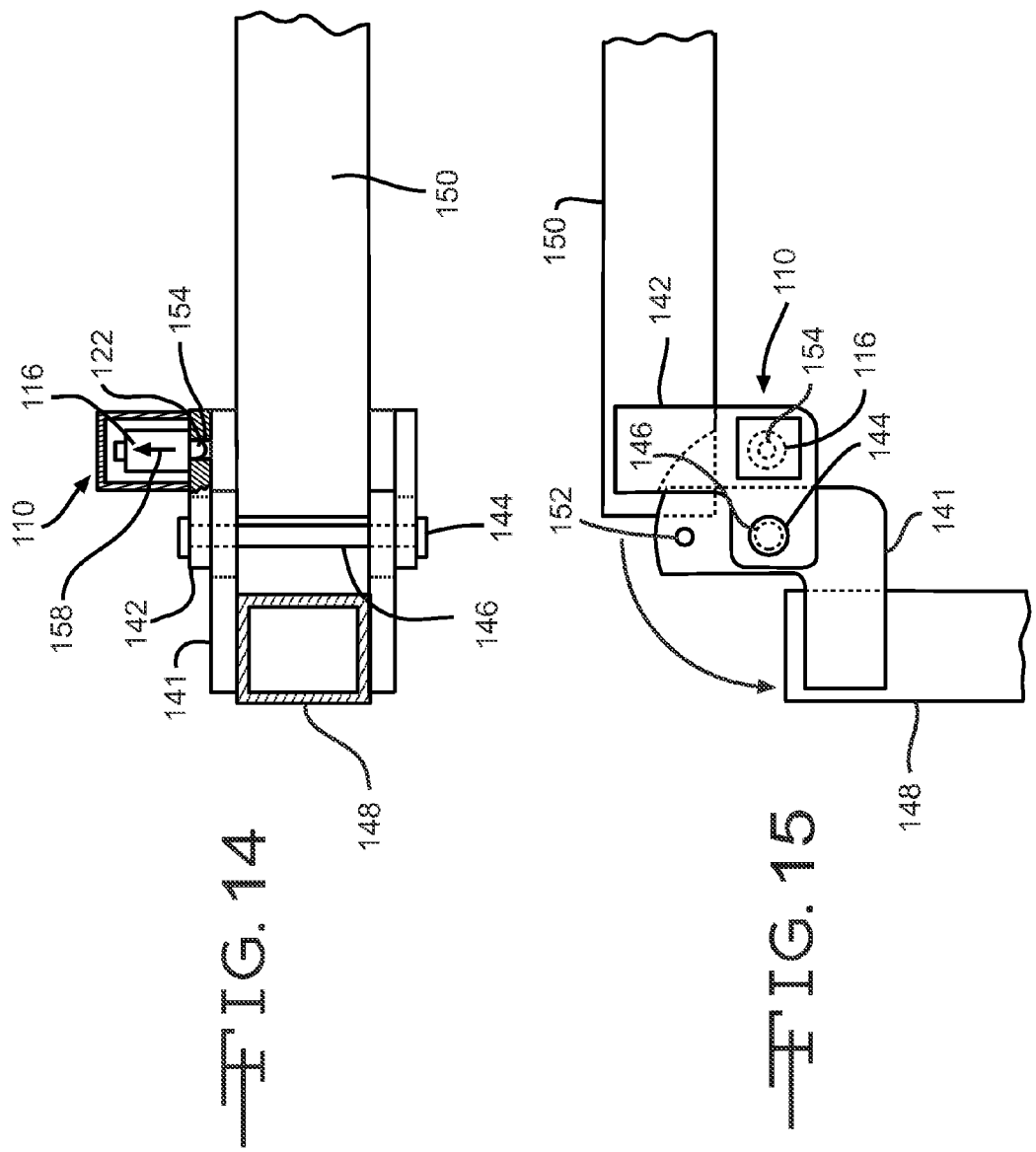

MANIFOLD ACTUATOR ASSEMBLY

FIELD OF THE INVENTION

The present invention relates to a manifold actuator assembly which may be incorporated into a seed meter to open and close gates to control product dispersion, or which may be used to provide automatic locking and unlocking capabilities in a wide-variety of applications.

BACKGROUND OF THE INVENTION

Volumetric meters are commonly used in agricultural seeding implements such as grain drills and air seeders to meter the seed. Volumetric meters are also used with fertilizer applicators. A volumetric meter often employs a meter roller contained within a housing that defines an inlet for receiving product from a tank, typically located above the meter roller to feed seed into the housing by gravity. The meter roller is fluted so that as the roller is rotated, product from the tank is carried to an outlet in a controlled manner based on the size of the roller flutes and speed of rotation of the roller. From the meter housing, the seed is carried by a distribution system for dispensing to the soil. The distribution system typically includes a number of individual channels each receiving seed from a defined section of the meter roller. The distribution system may be a gravity system that guides the seed as it falls downward from the meter to the soil. Alternatively, the distribution system may be pneumatic, using flowing air to distribute the seed from the meter. A pneumatic system may also further divide the seed delivered from the meter to one channel of the distribution system into multiple individual row distribution tubes.

In contrast to a volumetric seed meter, row crop planters use individual seed meters located at each row unit. These meters are supplied by either individual seed hoppers mounted to the row unit or supplied with seed from a central tank, often with a pneumatic system to deliver the seed. The seed meters, however, instead of metering the seed based on volume, singulate the seed and deliver one or more seeds upon specified intervals. Recent products have been made available on row crop planters that shut-off the flow of seed at the individual row units. This is often accomplished by a clutch mechanism in the seed meter drive that is actuated to disengage the seed meter drive. These have met with commercial success as customers seek to control costs by eliminating any double seeding which can occur at the edge of a field when the area remaining to be seeded is not as wide as the planter or in a non-rectangular field where the rows do not all end at the same location or when crossing waterways that are covered with grass and are not to be seeded. Since the seed shut-off is at the individual meter mounted on the row, there is only a short or no delay from the time the meter is shut-off to stoppage of the seed flow at the soil.

To provide a similar shut-off on a volumetric meter having an air, i.e. pneumatic, distribution system, a number of unique challenges must be overcome that do not exist with a row crop planter. These challenges include: 1) if seed is stopped from flowing into the meter, there is a long delay until seed stops flowing at the discharge since the meter must empty before seed flow stops; 2) air seeders may mix multiple products within the airstream so that stopping the flow of seed to the ground by redirecting the flow after the seed is introduced into the airstream requires separation of the mixed products; and 3) with some air seeders, the product tanks are pressurized during operation, further complicating the return of redirected product to the tank.

One approach to providing a sectional meter shut-off is shown in US patent application publication number 2009/0079624, published Mar. 26, 2009. Slidable gates are positioned between the product storage tank and the meter roller. Individual actuators are provided to move each gate between open and closed positions. Because the gates are positioned between the storage tank and the meter, after actuation of the shut-off actuators, product will continue to flow until the meter is emptied of product. This arrangement does nothing to address the first challenge listed above. In addition, the sliding gate must "cut" through seed flowing from the product tank generally perpendicular to the direction of motion of the sliding gate.

Current methods of shutting gates in seed meters typically utilize electrical-driven, air-driven, or hydraulic-driven actuators. Electrical actuators are often slow or require large amounts of current that are not available within a tractor system. Air systems offer speed and power, but pressurized air is typically not available in large quantities on a tractor or planter. Moreover, the cost of the compressor and storage tank may be substantial, and the required plumbing and control systems are not well integrated and may be difficult to install. Standard hydraulic actuators are too large and do not provide a well-integrated solution.

An actuator system is needed which will solve one or more of the problems of the current actuators.

SUMMARY OF THE INVENTION

In one embodiment of the invention, a manifold actuator assembly is provided. The manifold actuator assembly includes a manifold, a hydraulic actuator, and a solenoid valve. The manifold comprises a block. The hydraulic actuator and the solenoid valve are disposed within the manifold, and are connected. The solenoid valve controls hydraulic, linear movement of a rod of the hydraulic actuator.

In another embodiment of the invention, a metering system is provided for metering product in a seeding machine. The metering system includes a meter roller, a gate, and a manifold actuator assembly. The meter roller is for metering product to a distribution system. The gate is disposed between the meter roller and the distribution system. The gate is movable between an open position in which product is allowed to flow from the meter roller to the distribution system, and a closed position in which product is prevented from flowing from the meter roller to the distribution system. The manifold actuator assembly includes a hydraulic actuator and a solenoid valve both disposed within a manifold. The solenoid valve controls hydraulic movement of the hydraulic actuator to move the gate from the open position to the closed position.

In yet another embodiment of the invention, a locking apparatus is provided. The locking apparatus includes a hydraulic actuator, a solenoid valve, a manifold, and first and second members. The hydraulic actuator and the solenoid valve are both disposed within the manifold. The solenoid valve is arranged to move the hydraulic actuator from a first location in which the hydraulic actuator locks the first and second members together, to a second location in which the hydraulic actuator unlocks the first and second members.

These and other features, aspects and advantages of the invention will become better understood with reference to the following drawings, description and claims.

BRIEF DESCRIPTION OF THE DRAWINGS

FIG. 2 is a side elevational view of the seed meter of the air seeder shown in FIG. 1;

FIG. 3 is a side elevational view of the portion of FIG. 2 in the circle 3 illustrating the actuator rod in a retracted position;

FIG. 12 is a side view of one embodiment of a manifold actuator assembly being used to lock first and second members together;

FIG. 13 is a top view of the manifold actuator assembly of FIG. 12 being used to lock the first and second members together;

FIG. 14 is a side view of the manifold actuator assembly of FIG. 12 unlocking the first and second members; and FIG. 15 is a top view of the manifold actuator assembly of FIG. 12 unlocking the first and second members.

DESCRIPTION OF THE PREFERRED EMBODIMENT

Figure 1:
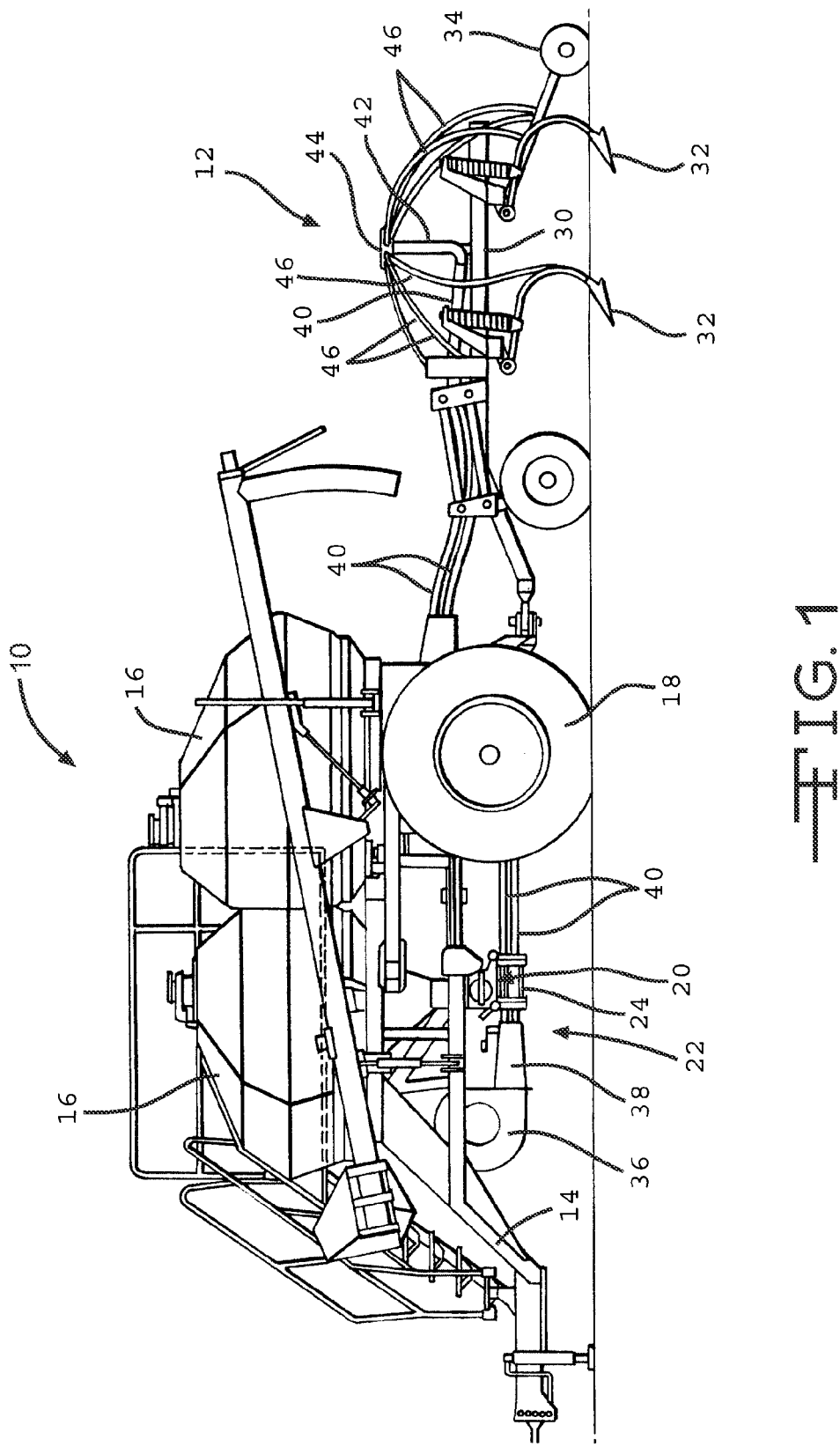
FIG. 1 is a side elevational view of an air seeder and tiling implement having the sectional meter shut-off of the present invention.

An air seeder constructed according to a preferred embodiment of the present invention is shown in the figures. With reference to FIG. 1, an air seeder is shown comprising a seed cart 10 towed between a tractor (not shown) and a tilling implement 12. The seed cart 10 has a frame 14 to which product tanks 16 and wheels 18 are mounted. Each product tank 16 has an associated metering system 20 at its lower end for controlled feeding of product into a pneumatic distribution system 22 at a primary distribution manifold 24. The tilling implement 12, towed behind the seed cart 10, consists generally of a frame 30 to which ground openers 32 are mounted. Incorporation of seed row finishing equipment such as closing wheels 34 is also desirable in many applications.

The pneumatic distribution system 22 includes a centrifugal fan 36 connected to a plenum 38, which is in turn connected to one or more primary distribution manifolds 24, each associated with a product tank 16. The individual passages in the primary distribution manifold 24 are each connected by a distribution line 40 to a riser tube 42, only one of which is shown. Each riser tube 42 is in turn coupled to a secondary distribution header 44. Distribution lines 46 connect the secondary distribution header 44 to seed boots mounted on the ground openers 32 to deliver product, seed or fertilizer, etc. to the furrow formed by the openers 32. Further detail of the air seeder can be found in U.S. Pat. No. 5,878,679, hereby incorporated by reference. While the air seeder of FIG. 1 is shown as a separate air cart connected to a tilling implement, the product tanks 16, metering system 20 and distribution system 22 can be mounted to the same frame as the ground openers 32.

The metering system 20 will now be described in greater detail with reference to FIGS. 2-5. Metering system 20 includes a housing 50 having an upper end 52 that is coupled to a product tank 16. The housing 50 further has a lower end 54 that is coupled to the primary manifold 24 of the pneumatic distribution system. The housing 50 forms an inlet passage 56 through which product is received into the housing and an outlet passage 58 through which metered product is delivered to the distribution system. A rotary cut off valve 60 is placed in the inlet passage 56 and can be rotated as shown by the arrow 62 from the open position shown in FIG. 2 to a cleanout position in which product is discharged from the housing 50 to enable the product tank 16 to be emptied without the product flowing through the meter to the distribution system.

Figure 4:
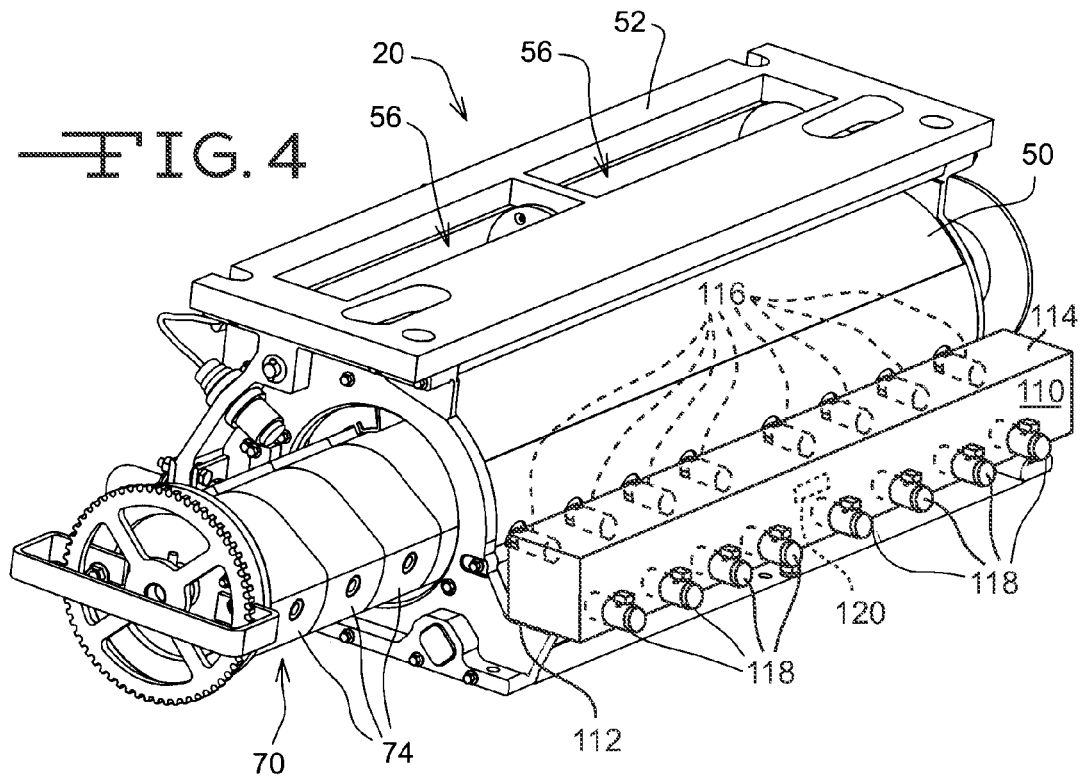
FIG. 4 is a perspective view of the seed meter shown in FIG. 2.

The inlet passage 56 leads to a meter cartridge 70 which houses a meter roller 72. The cartridge 70 is removable from the meter housing 50 as shown in FIG. 4 where the cartridge 70 is shown partially withdrawn from the housing 50. The cartridge consists of a plurality of meter casings 74 placed adjacent to one another and fastened together by elongated bolts 84, FIG. 5, extending through apertures 76 in the meter casings. The meter roller 72 is constructed of a plurality of roller segments 78 axially positioned along a drive shaft 80. In the embodiment shown, the drive shaft 80 is hex shaped to mate with the hex shaped bore 82 in the roller segments 78. Additional attaching hardware is shown and described in the above referenced U.S. Pat. No. 5,878,679.

Figure 5:
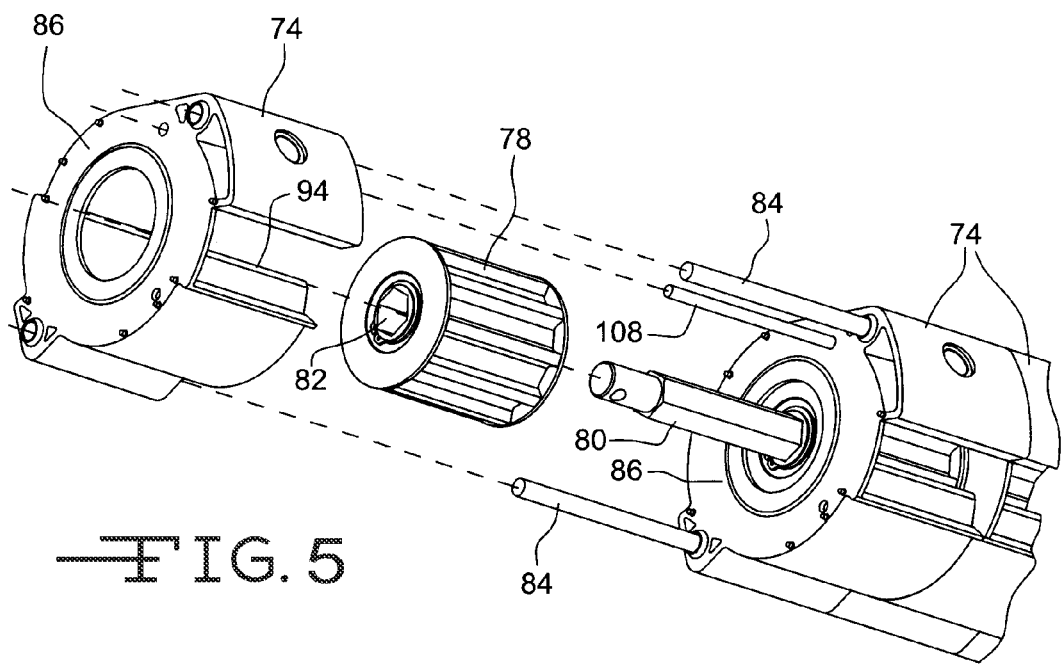
FIG. 5 is an exploded perspective view of the meter cartridge illustrating one meter casing and one roller segment separated from the cartridge.
Figure 6:
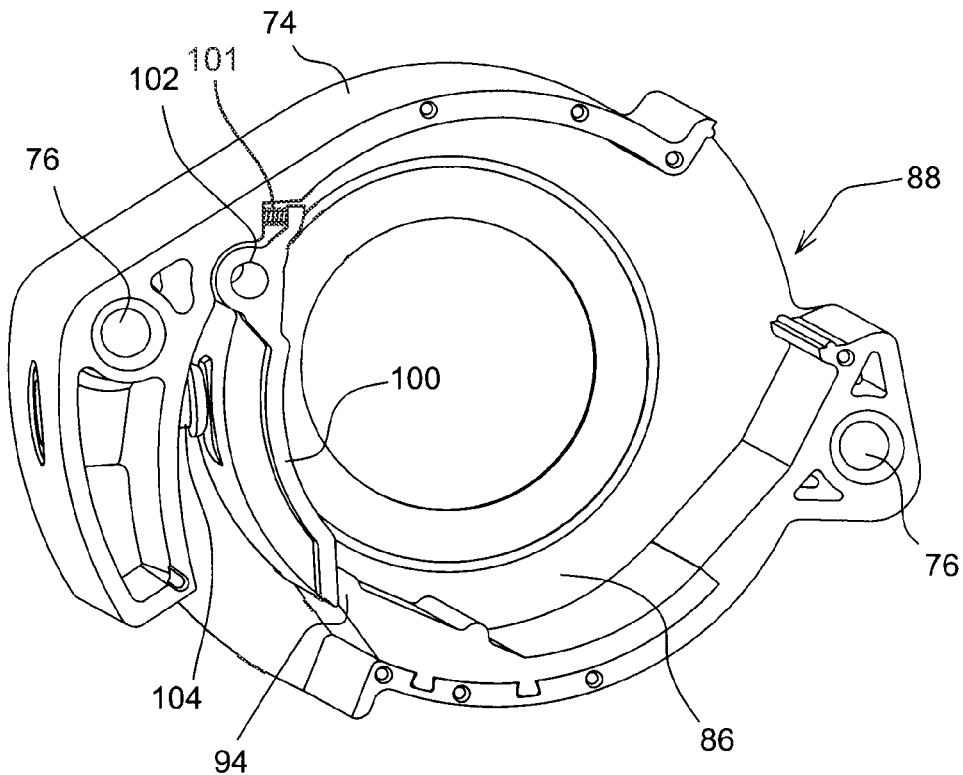
FIG. 6 is a perspective view of the seed meter casing illustrating the gate in the closed position.
Figure 7:
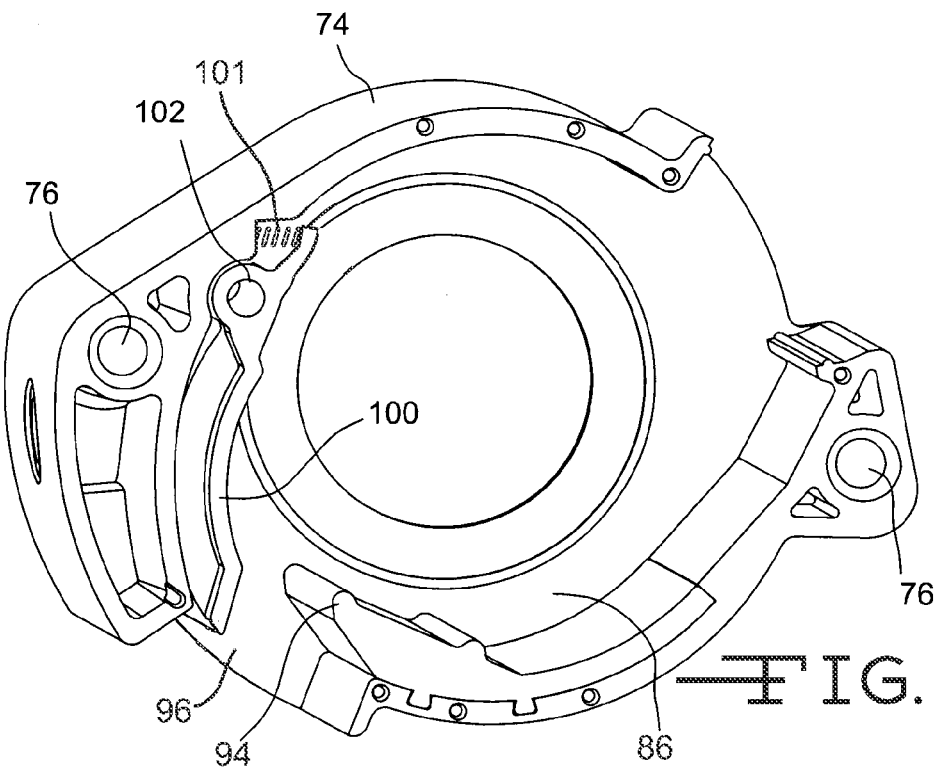
FIG. 7 is a perspective view of the seed meter casing shown in FIG. 6 illustrating the gate in the open position.

Each roller segment 78 is disposed within a separate meter casing 74. Each meter casing 74 has a radial wall 86 along one axial end of the casing that separates adjacent roller segments from one another axially along the shaft 80. Each casing 74 defines an inlet 88 in communication with the inlet passage 56 of the meter housing for receiving product there-from. As the meter roller 72 rotates, as shown by the arrow 90 in FIG. 2, product is displaced by the teeth and grooves 92 of the rollers, over the ledge 94 to the outlet 96 in the meter casing. From there product flows to the outlet passage 58 in the meter housing and to the manifold 24 of the distribution system 22. As shown in FIGS. 2, 3, 6, and 7, for each meter casing 74, a shut-off gate 100 is provided to selectively shut-off the flow of seed from a given section of the meter roller 72. Each shut-off 100 gate is pivotally mounted to the meter casing at pivot 102, near a proximal end of the gate 100, and biased to an open position due to a separate respective tension spring 101 acting upon the gate 100. In other embodiments, the shut-off gates 100 may move through other mechanisms such as sliding, or may be biased to open positions using other biasing mechanisms such as spring tabs or other biasing means. As shown in FIG. 5, a pivot rod 108 extends axially through the cartridge 70 to pivotally mount the shut-off gates 100. Each plunger 104 is slide-ably movable within a corresponding sleeve 106 in the meter casing from a closed position against the corresponding gate 100 holding the corresponding gate 100 in the closed position as shown in FIGS. 2 and 6, to a retracted position within the corresponding sleeve 106 and away from the corresponding gate 100 allowing the corresponding gate 100 to open as shown in FIGS. 3 and 7. When each gate 100 is in the closed position of FIGS. 2 and 6, product is prevented from flowing over the ledge 94 due to the gate 100 being disposed against the ledge 94. When each gate 100 is in the open position of FIGS. 3 and 7, product is allowed to flow over the ledge 94 due to the gate 100 being disposed away from the ledge 94.

As shown in FIGS. 2-4, a manifold actuator assembly 110 is mounted to the meter housing 50 and is disposed on a ledge 112 adjacent the meter housing 50. As shown in FIGS. 2-4, 9, and 11, the manifold actuator assembly 110 includes a manifold 114, hydraulic actuators 116, solenoid valves 118, and a pressure regulator valve 120 disposed within the manifold 114. The manifold 114 comprises a block having a plurality of internal passages. The internal passages are cut out of the block to be integral to the block. The internal passages connect each hydraulic actuator 116 to a separate respective solenoid valve 118, and also connect the solenoid valves 118 and the hydraulic actuators 116 to the pressure regulator valve 120. The internal passages may be disposed in a wide variety of configurations within the manifold 114 to allow the hydraulic actuators 116 to function as either one-way or two-way hydraulic actuators 116, controlled by the solenoid valves 118. Each solenoid valve 118 separately and independently controls one of the hydraulic actuators 116. The solenoid valves 118 may comprise a spool type, 2-position, 3-way, drop-in cartridge valve manufactured by HydraForce, Inc. The pressure regulator valve 120 regulates the hydraulic pressure of the fluid supplied to the solenoid valves 118 and the hydraulic actuators 116.

Figure 8:
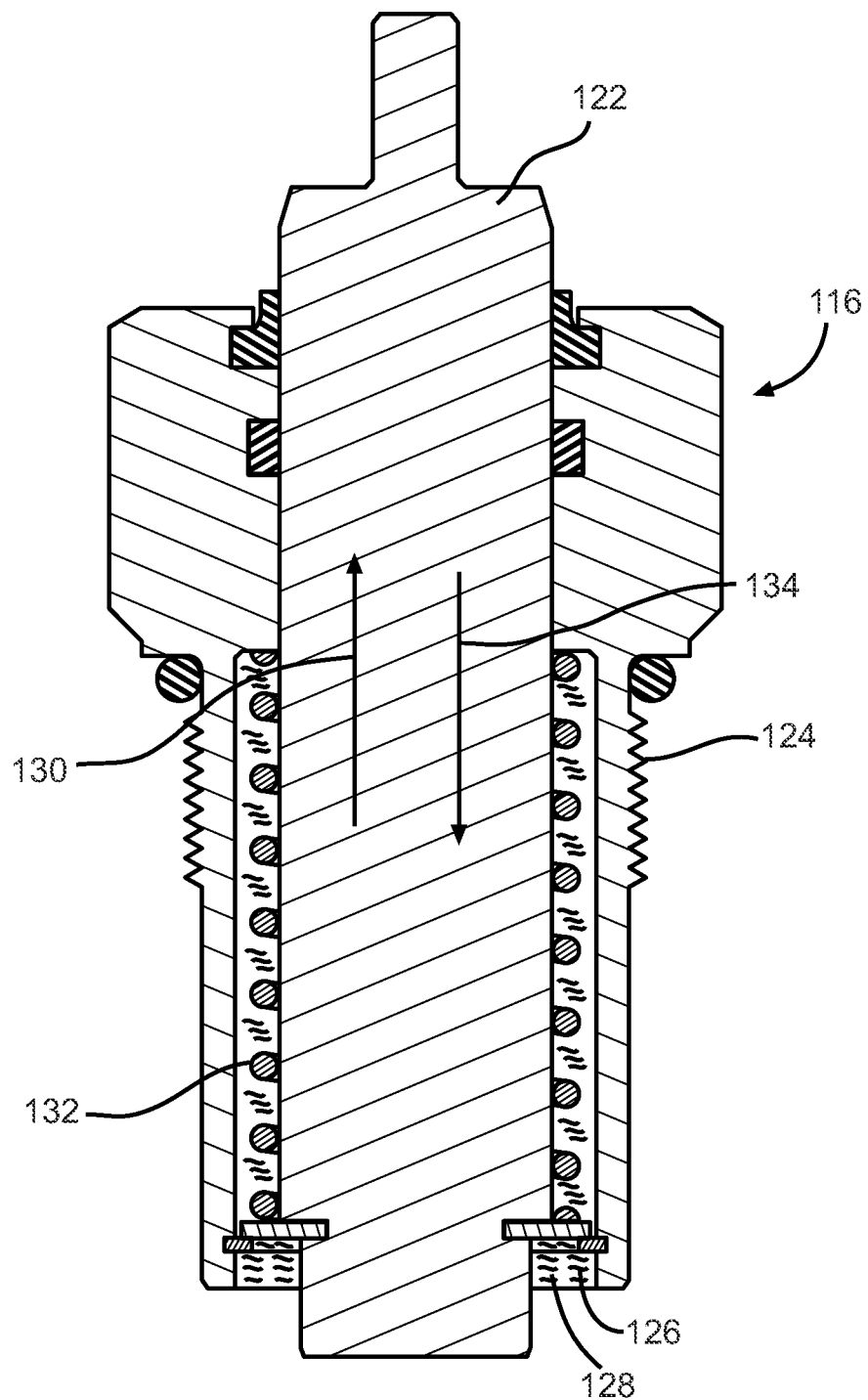
FIG. 8 is a cross-sectional view through one embodiment of a one-way actuator which may be used for the actuators of the manifold actuator assembly of FIG. 2.
Figure 9:
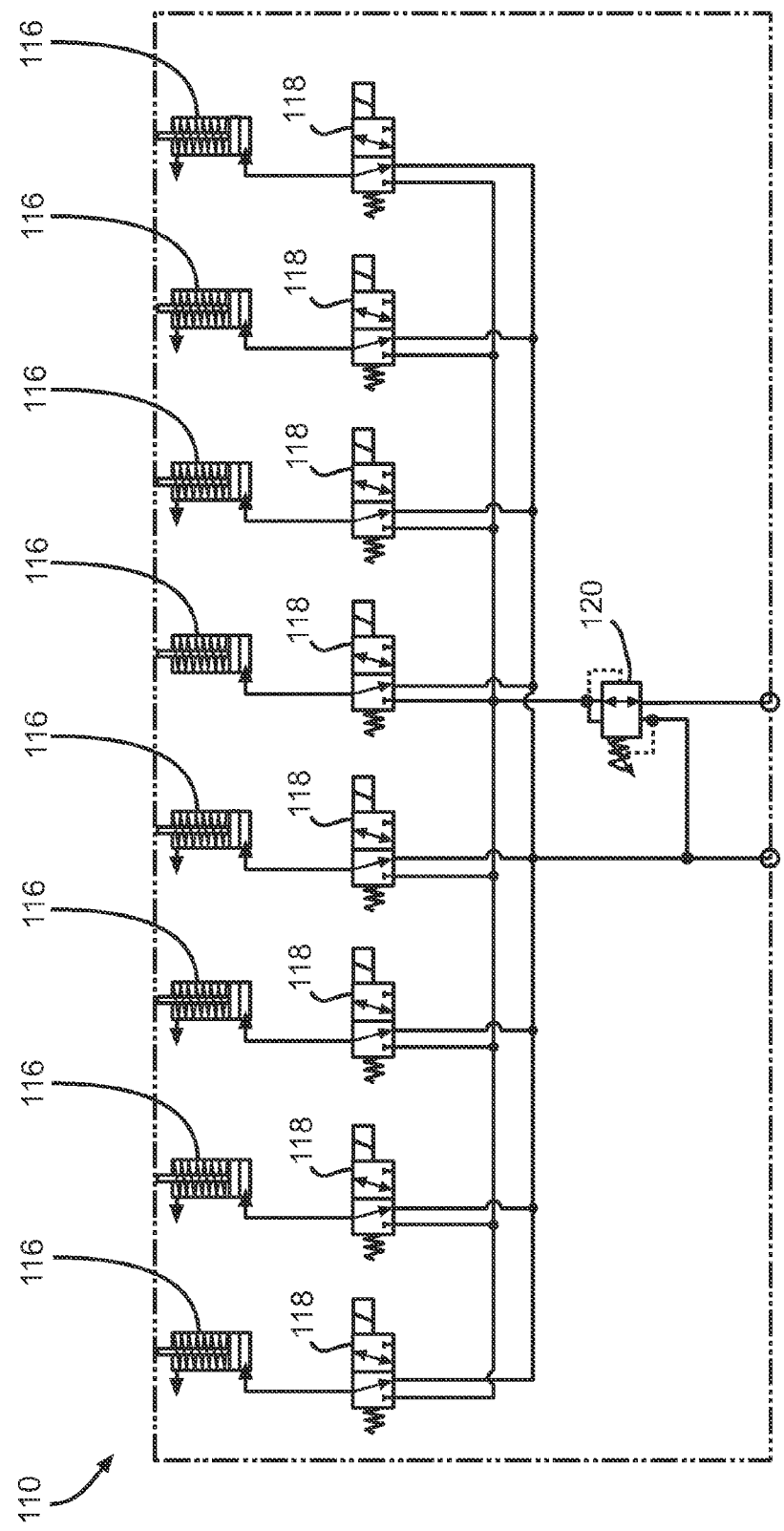
FIG. 9 is a circuit schematic of one embodiment of a manifold actuator assembly using a plurality of the one-way actuator shown in FIG. 8.

As shown in FIG. 8, in one embodiment each hydraulic actuator 116 comprises a rod 122 disposed within a cylinder 124. Each hydraulic actuator 116 may comprise a one-way hydraulic actuator in which, when the respective solenoid valve 118 is moved to a first open position, hydraulic fluid 126 enters into port 128 of the respective hydraulic actuator 116 to force the rod 122 to extend linearly in direction 130 from a first retracted location to a second extended location. When the respective solenoid valve 118 is moved to a second closed position, the hydraulic fluid 126 is drained from the port 128 of the respective hydraulic actuator 116 and a spring 132 disposed within the cylinder 124 forces the rod 122 to retract linearly in direction 134 from the second extended location to the first retracted location. FIG. 9 shows an exemplary circuit block diagram of a one-way hydraulic actuator arrangement which may be utilized in one embodiment of the manifold actuator assembly 110 to hydraulically control hydraulic actuators 116 using solenoid valves 118 and pressure regulator valve 120.

Figure 10:
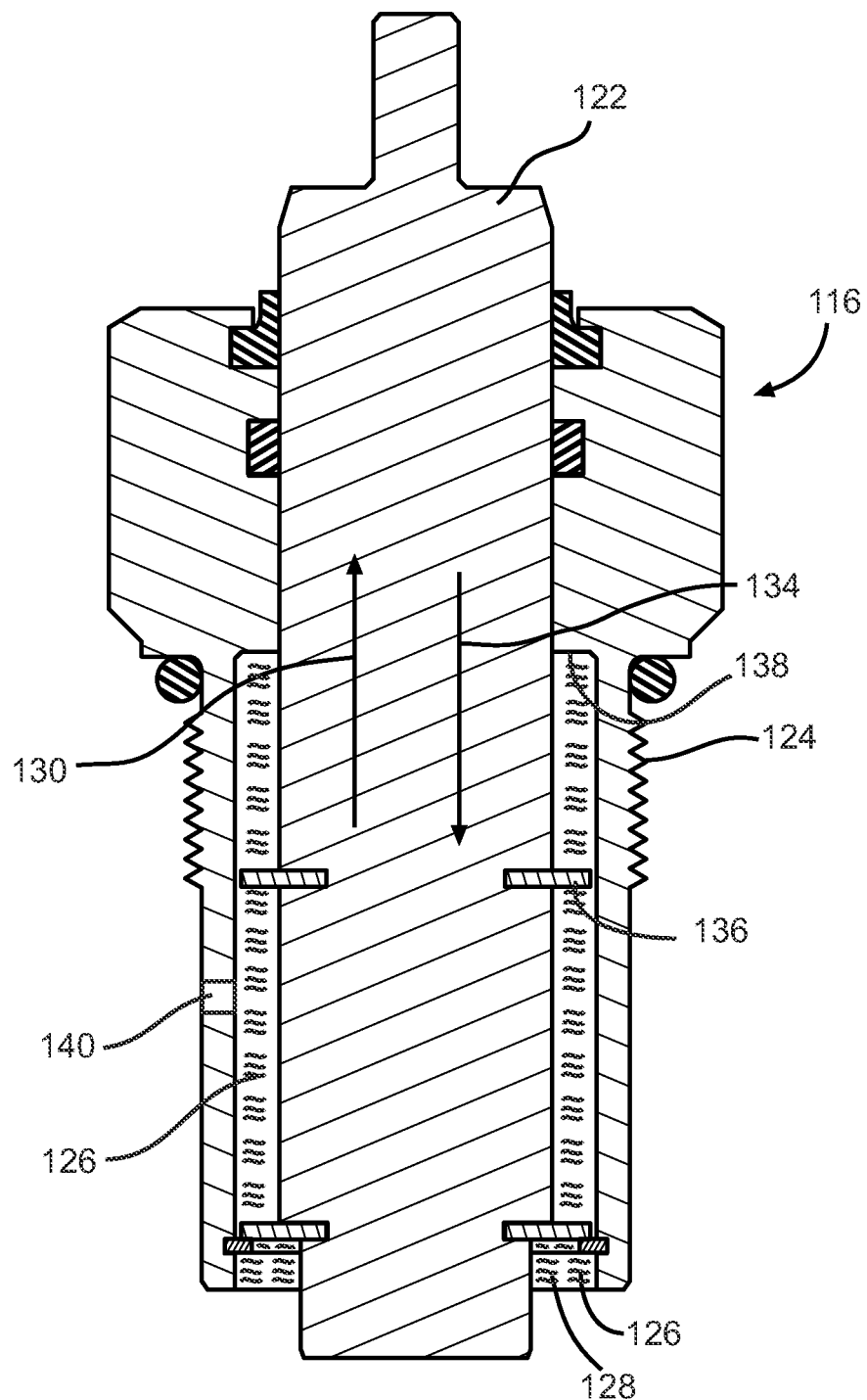
FIG. 10 is a cross-sectional view through one embodiment of a two-way actuator which may be used for the actuators of the manifold actuator assembly of FIG. 2.
Figure 11:
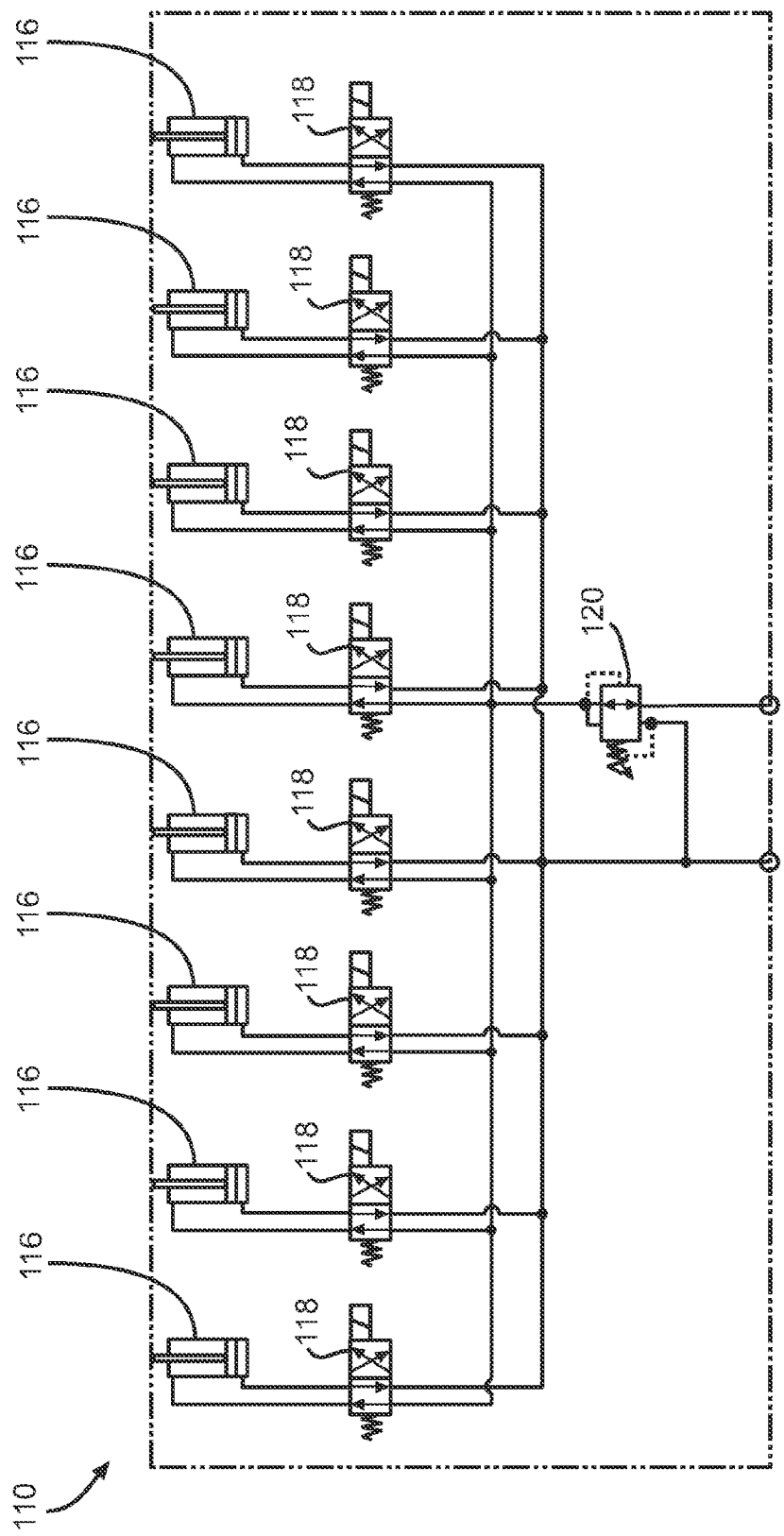
FIG. 11 is a circuit schematic of one embodiment of a manifold actuator assembly using a plurality of the two-way actuator shown in FIG. 10.

In another embodiment, as shown in FIG. 10, each hydraulic actuator 116 may comprise a two-way hydraulic actuator in which, when the respective solenoid valve 118 is moved to a first open position, hydraulic fluid 126 enters into port 128 of the respective hydraulic actuator 116 to force the rod 122 to extend linearly in direction 130 from a first retracted location to a second extended location until the shoulder ring 136 attached to the rod 122 abuts against an inner surface 138 of the cylinder 124 and forces the rod 122 to stop. When the respective solenoid valve 118 is moved to a second closed position, the hydraulic fluid 126 may be drained from the port 128 of the respective hydraulic actuator 116 and hydraulic fluid 126 may enter another port 140 of the respective hydraulic actuator 116 to force the rod 122 to retract linearly in direction 134 from the second extended location to the first retracted location. FIG. 11 shows an exemplary circuit block diagram of a two-way hydraulic actuator arrangement which may be utilized in one embodiment of the manifold actuator assembly 110 to hydraulically control hydraulic actuators 116 using solenoid valves 118 and a pressure regulator valve 120.

As shown in FIGS. 2 and 3, each rod 122 of the manifold actuator assembly 110 may be moveably disposed within a separate sleeve 106 against and away from an associated plunger 104. As shown in FIG. 2, when the corresponding hydraulic actuator 116 extends the associated rod 122 from its first retracted location to its second extended location, the rod 122 may force the corresponding plunger 104 to slide out of the sleeve 106 against the associated gate 100 causing the gate 100 to pivot into the closed position between the meter roller 72 and the separate product runs to prevent product from flowing over the ledge 94 to the outlet 96 in the meter casing 74.

As shown in FIG. 3, when the corresponding hydraulic actuator 116 retracts the associated rod 122 from its second extended location to its first retracted location, the rod 122 may remove the force from the corresponding plunger 104 allowing the plunger 104 to slide back into the sleeve 106 out of contact with the associated gate 100. This may allow the gate 100 to pivot into the open position between the meter roller 72 and the separate product runs to allow product to flow over the ledge 94 to the outlet 96 in the meter casing 74. When the rods 122 are in their first retracted locations they are contained within the housing 50 as shown in FIG. 3. This allows the meter cartridge 70 to be removed from the housing as shown in FIG. 4. The plungers 104 and sleeves 106 are contained within their respective meter casings so as to not interfere with the housing 50 during insertion or removal of the cartridge 70 into and from the housing 50.

Due to the use of multiple solenoid valves 118 independently controlling separate respective hydraulic actuators 116, closing and opening of each of the gates 100 may be independently controlled. This allows for precise control of product distribution through the outlets 96 of the meter casings 74.

The hydraulic actuators 116 can be controlled selectively by an operator through a control panel in a tractor cab or, preferably, the hydraulic actuators 116 are controlled by field mapping software in combination with GPS or other vehicle positioning system. With the use of field maps and vehicle positioning, the hydraulic actuators 116 will be activated to close product flow from the meter 70, and thus stop product flow to one or more of the distribution lines 40 which supply product to one or more rows of the tilling implement 12, as the tilling implement covers area which has already been seeded or which should not be seeded.

The shut-off gate 100 for a volumetric meter of the present invention, located after the meter roller but before product has moved into the air stream, overcomes the challenges described above. The long delay between shut-off and the termination of product discharge at the row is reduced since the meter does not need to empty before product flow ceases. Since the product is stopped before the product enters the air stream, diversion of the product back to the tank is not needed. This avoids the need to separate mixed products and avoids the difficulty of returning product to a pressurized tank. While the invention has been shown and described in the context of an air seeder, it will be appreciated by those skilled in the art that the invention can be used with any volumetric meter such as a grain drill that uses gravity to distribute seed from the meter to the ground.

In other embodiments, the manifold actuator assembly 110 may be used to move the rods 122 against or with varying types of members to allow opening or closing of differing components in a wide variety of systems or applications. For instance, as shown in FIGS. 12-15, in one embodiment one or more of the hydraulic actuators 116 of the manifold actuator assembly 110 may be arranged to function as a locking apparatus to alternate between locking together and unlocking first and second members 141 and 142. The first and second members 141 and 142 may comprise separate plate portions of a pivotally attached joint 144 which are attached together using a hinge pin 146. The first member 141 may be attached to a first tube 148, and the second member 142 may be attached to a second tube 150. Each of the first and second members 141 and 142 may have holes 152 and 154. As shown in FIGS. 12-13, when the first and second members 141 and 142 are rotated to align holes 152 and 154, the solenoid valve 118 (not shown) may move the hydraulic actuator 116 from a second location to a first location to linearly move the rod 122 of the hydraulic actuator 116 along direction 156 into both of the aligned holes 152 and 154 to lock the first and second members together 141 and 142.

As shown in FIGS. 14-15, when it is desired to unlock the first and second members 141 and 142, the solenoid valve 118 (not shown) may move the hydraulic actuator 116 from the first location to the second location to linearly move the rod 122 of the hydraulic actuator 116 along direction 158 out of hole 154 to unlock the first and second members 141 and 142 from one another.

The hydraulic actuator 116 of the manifold actuator assembly 110 of the embodiment of FIGS. 12-15 may be a one-way hydraulic actuator 116, as shown and described in FIGS. 8-9, or a two-way hydraulic actuator 116, as shown and described in FIGS. 10-11. In other embodiments, any number of hydraulic actuators 116 of the manifold actuator assembly 110 may be used, in conjunction with any number of corresponding solenoid valves 118, to move corresponding rods 122 to lock or unlock varying numbers and types of members in differing systems or applications.

The manifold actuator assembly 110 of the invention is easily integrated into a typical manifold 114 without the requirement of any additional plumbing or mounting for the hydraulic actuators 116, the solenoid valves 118, or the pressure regulator valve 120. The manifold actuator assembly 110 allows for a wide range of sizes and pressure ranges utilizing current parts and tooling with minimal installation time. This results in reduced cost. Moreover, because manifolds 114 are machined to tight tolerances, there are inherently accurate locations of the hydraulic actuators 116 minimizing tolerance stack up issues.

Having described the preferred embodiment, it will become apparent that various modifications can be made without departing from the scope of the invention as defined in the accompanying claims.

The invention claimed is:

1. A manifold actuator assembly comprising:
a manifold comprising a block, the block comprising an integral passage comprising a portion of the block itself;
a hydraulic actuator disposed within the block; and
a solenoid valve disposed within the block, the solenoid valve connected via the integral passage to the hydraulic actuator, wherein the solenoid valve is configured to move a rod of the hydraulic actuator.

2. The manifold actuator assembly of claim 1 wherein when the solenoid valve is moved to a first position hydraulic fluid moves the rod from a first location to a second location, and when the solenoid valve is moved to a second position the hydraulic fluid moves the rod from the second location to the first location.

3. The manifold actuator assembly of claim 1 wherein the rod is arranged to move a member located outside of the manifold when the solenoid valve moves the rod from a first location to a second location.

4. The manifold actuator assembly of claim 1 further comprising a pressure regulator valve disposed within the block configured to regulate hydraulic pressure supplied to the hydraulic actuator through the solenoid valve.

5. The manifold actuator assembly of claim 4 wherein the block comprises a plurality of integral passages disposed within the block connecting the hydraulic actuator, the solenoid valve, and the pressure regulator valve.

6. The manifold actuator assembly of claim 1 further comprising a plurality of hydraulic actuators and a plurality of solenoid valves disposed within the block, wherein each of the solenoid valves is configured to independently move a rod of one of the hydraulic actuators.

7. The manifold actuator assembly of claim 6 further comprising a plurality of members located outside of the manifold, wherein each of the solenoid valves is configured to independently move the rod of its associated hydraulic actuator against one of the plurality of members located outside of the manifold in order to independently move the plurality of members.

8. The manifold actuator assembly of claim 6 wherein the block comprises a plurality of integral passages disposed within the block connecting the plurality of hydraulic actuators to the plurality of solenoid valves within the block.

9. The manifold actuator assembly of claim 1 wherein the integral passage is cut into the block itself.

10. The manifold actuator assembly of claim 1 wherein when the solenoid valve is moved to a first position hydraulic fluid moves the rod from a first location to a second location, and when the solenoid valve is moved to a second position the rod moves from the second location to the first location.

11. A manifold actuator assembly comprising:
a manifold comprising a block, the block comprising a plurality of integral passages comprising portions of the block itself;
a plurality of hydraulic actuators disposed within the block; and
a plurality of solenoid valves disposed within the block each connected via one of the plurality of the integral passages to an associated one of the hydraulic actuators and each configured to independently control movement of a rod of its associated hydraulic actuator.

* * * * *